Feb. 14, 1933.  A. M. LUTES  1,897,063
MOTOR
Filed Sept. 26, 1929   2 Sheets-Sheet 1
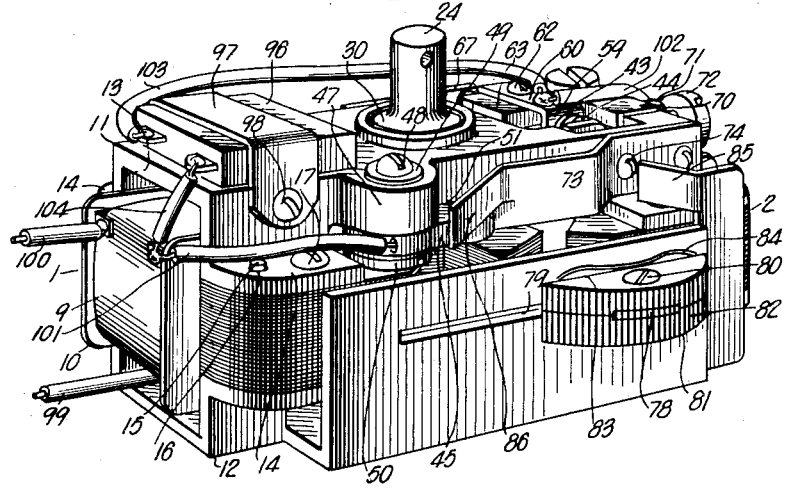
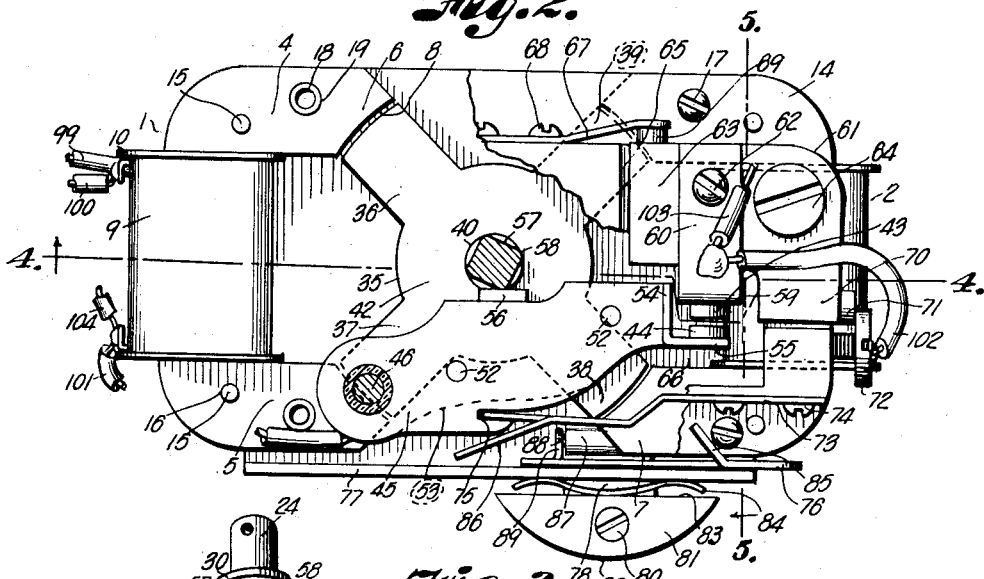
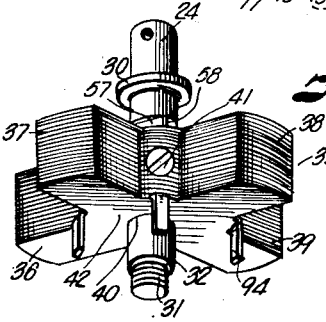
INVENTOR
Arthur M. Lutes.
BY Arthur C. Brown
ATTORNEY Feb. 14, 1933.  A. M. LUTES  1,897,063
MOTOR
Filed Sept. 26, 1929   2 Sheets-Sheet 2
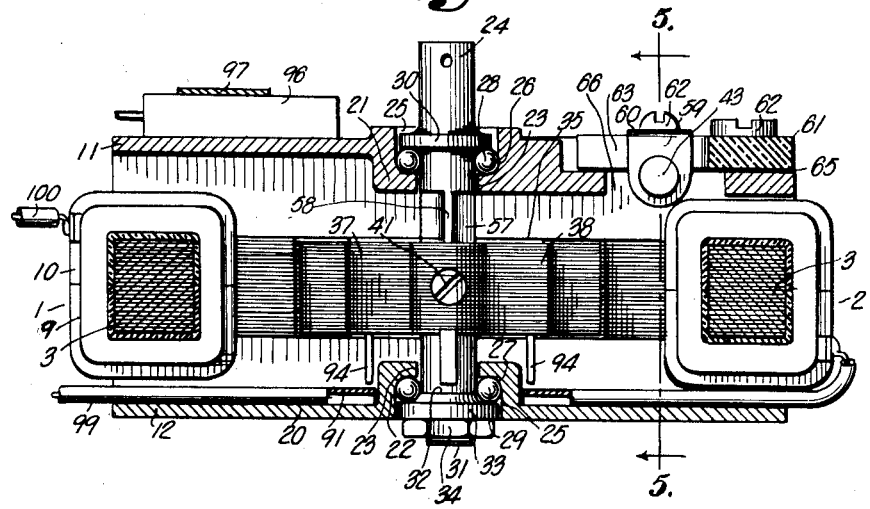
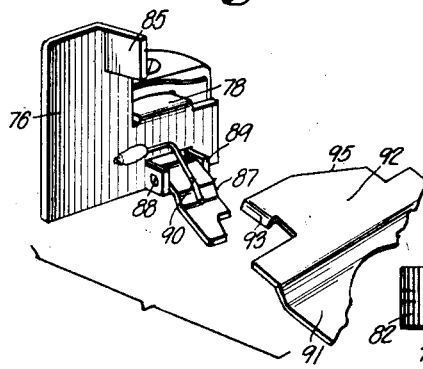
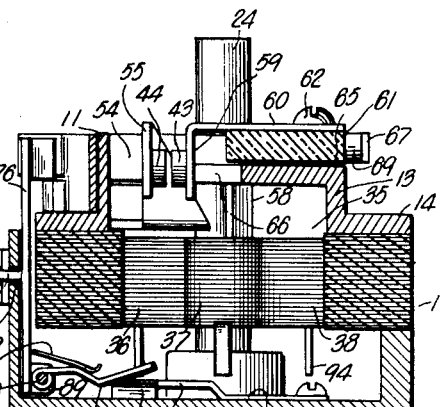
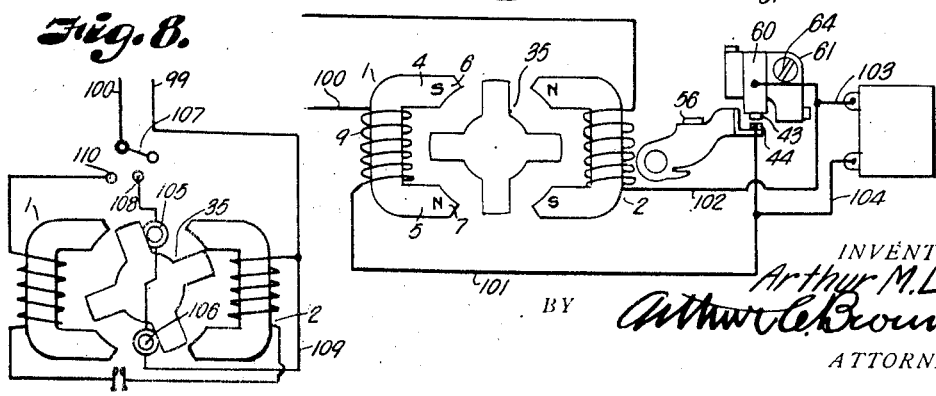
INVENTOR
*Arthur M. Lutes*
BY *Arthur C. Brown*
ATTORNEY Patented Feb. 14, 1933

1,897,063

UNITED STATES PATENT OFFICE

ARTHUR M. LUTES, OF KANSAS CITY, MISSOURI, ASSIGNOR OF ONE-HALF TO A. C. FLACK, OF FREDONIA, KANSAS

MOTOR

Application filed September 26, 1929. Serial No. 395,336.

My invention relates to electric motors, and more particularly to motors of the magnetic type. The principal object of the invention is to provide a simple, efficient and durable motor of diminutive size to permit installation in restricted bounds such as in tool handles or the like.

Other objects of the invention are to provide for quiet operation and to eliminate interference of the motor with radio reception.

In accomplishing these and other objects of the invention, I have provided improved details of structure, the preferred form of which is illustrated in the accompanying drawings, wherein:

Fig. 1 is a perspective view of a motor constructed in accordance with my invention.

Fig. 2 is a plan view of the motor, a part of the upper housing plate being broken away to better illustrate the electro-magnets and the rotor associated therewith.

Fig. 3 is a perspective view of the rotor.

Fig. 4 is a longitudinal, vertical, sectional view through the motor taken on the line 4—4, Fig. 2, the rotor being shown in elevation.

Fig. 5 is a cross sectional view through the motor on the line 5—5, Fig. 2.

Fig. 6 is a perspective view of the switch actuator and the cam plate shown in spaced relation with each other.

Fig. 7 is a diagrammatic view of the electro-magnets and breaker points particularly illustrating their electrical connection.

Fig. 8 is a diagrammatic view of the motor illustrating electric magnets for initially starting the rotor.

Referring more in detail to the drawings:

1 and 2 designate electro-magnets, each of which is of U-shaped formation and laminated as in ordinary motor construction, and includes a coil supporting portion 3 having laterally projecting arms 4 and 5 to provide magnetic pole pieces 6 and 7. The ends of the pole pieces are curved as at 8 to accommodate a rotor or armature hereinafter described. The coils 9 are wound on spools 10 received on the bar portions 3 of the magnets as in ordinary magnet construction.

The magnets 1 and 2 are positioned with their pole pieces facing each other and are spaced apart to accommodate the rotor, the magnets being retained in position by upper and lower housing plates 11 and 12.

The housing plates are provided with outwardly projecting channel portions 13 of sufficient depth to accommodate the coils 9, and the channel portions are provided with laterally extending side flanges 14 complementary to the contour of the magnets 1 and 2.

The housing plates 12 and 13 are positioned with relation to the magnets by dowel pins 15 extending through the magnets and through openings 16 formed in the flanges 14, and are clamped to the magnets by bolts 17 which extend through the flanges 14 and through bushings 18 mounted in openings 19 formed in the magnets. The bushings 18 are of suitable length to correctly space the housing plates 11 and 12 to prevent binding of the rotor shaft later described.

Formed in the horizontal webs 20 of the housing plates, in axial alignment with the pole pieces of the magnets, are inwardly projecting bosses 21 and 22 provided with concentric shaft-receiving openings 23 to accommodate the rotor shaft 24. The bosses 21 and 22 are counterbored as at 25 to provide bearing races 26 and 27 for receiving ball bearing sets 28 and 29.

The rotor shaft 24 is provided adjacent its upper end with a flange 30 to provide a bearing race for the upper ball bearing set 28. and the lower end of the shaft is provided with a threaded extension 31 of reduced diameter to provide a stop shoulder 32 against which a bearing race 33 is seated for the lower set of bearings, the bearing race 33 being retained against the shoulder by a lock nut 34 threaded onto the extension 31 as is clearly illustrated in Fig. 4.

The rotor 35 is cruciform and also of a laminated construction, having four radially extending arms 36, 37, 38 and 39 of sufficient length to slightly clear the pole pieces 6 as shown in Fig. 2. The rotor is provided with an axial opening 40 to receive the rotor shaft and is adjustably retained thereon by a set screw 41 threaded into the hub portion 42 of the rotor and bearing against the rotor shaft.

Attention is here called to the fact that by providing four pole pieces and four arms on the rotor, four power impulses are received by each arm upon revolution of the rotor, and since the arms are always in the maximum fields of the pole pieces, power is applied substantially uniformly about the periphery of the rotor.

In order to adapt the motor to operate on direct and alternating currents, I provide means for making and breaking the circuit to the coils in timed relation with the position of the arms 37 to 39 with relation to the pole pieces 6 so that when adjacent arms align with the pole pieces of the respective magnets, the circuit is momentarily interrupted to allow the rotor to coast past the pole pieces, thereby assuring positive directional rotation as well as preventing the rotor from stopping on dead center, that is, when the arms align with the pole pieces 6. As soon as the arms coast past the pole pieces 6 the circuit to the coils is again closed so that the magnets can continue operation of the rotor.

The circuit maker and breaker preferably includes a fixed contact point 43 and a movable contact point 44 actuated from the rotor shaft 24 as now described. The contact point 44 is carried by a breaker arm 45 formed of insulation material and mounted on the upper housing plate 13 adjacent to the rotor shaft 24.

The arm 45 is pivotally mounted on a stud 46 threaded into an ear 47 projecting laterally from the upper housing plate 11, the stud being locked in the ear 47 by a screw 48 threaded into the stud, and having a washer 49 for engaging the upper surface of the ear. The arm 45 is retained between the ear 47 and a head 50 on the stud, and projects through a slot 51 formed in the side of the channel portion of the upper housing plate 11.

Riveted to the under side of the arm by rivets 52 is a conductor plate 53 having the substantial contour of the arm and is provided at the end thereof with an upwardly bent portion 54 having a laterally extending arm 55 carrying the contact point 44. The inner face of the arm adjacent the rotor shaft is provided with a shoe 56 for contacting a cam 57 formed on the rotor shaft 24 directly above the rotor.

The cam 57 here illustrated is formed by milling the shaft to provide lobes 58 for engaging the shoe 56 to move the breaker arm on its pivot. The rotor is positioned on the rotor shaft so that the lobes 58 contact the shoe 56 slightly in advance of the position where the arms 36 to 39 are aligning with the pole pieces, the rotor being adjustably mounted on its shaft for correctly timing the movement of the breaker arm as later described.

The contact point 43 is mounted on a depending arm 59 of a plate 60 which is mounted on a bell crank 61 by a screw 62 extending through the plate and threaded into the arm 63 of the bell crank.

The bell crank is formed of insulating material and is pivotally mounted on a stud 64 threaded in a recessed portion 65 in the upper housing plate 11.

The arm 63 is positioned so that the contact point 43 aligns with the contact point 44 and the arm 59 projects through an opening 66 formed in the recessed portion 65. The arm 63 is yieldingly urged by a leaf spring 67, fixed to the side of the channel portion of the upper plate by screws 68 extending through the spring and into the plate, the forward end of the spring bearing against a projection 69 carried by the arm 63.

In order to adjust spacing of the contact points, the other arm 70 of the bell crank is provided with a projection 71 engaged by the head of an adjusting screw 72 threaded into the end of the housing plate as clearly shown in Fig. 2.

The breaker arm 45 is adapted to be retained in engagement with the cam by means of a leaf spring 73 fastened to the side of the channel portion of the upper plate by screws 74 which project through the spring, and are threaded into the plate. The forward end of the spring is received in a notch 75 formed in the breaker arm as best shown in Fig. 2, so that when the spring is in relaxed position the contact points are retained apart.

In order to tension the spring 73 for moving the breaker arm to close the contact points, I provide a plate 76 slidable longitudinally of the motor on a flange 77 formed integrally with the bottom housing plate 12 and spaced from the magnets 1 and 2 to provide a path for the plate.

The plate 76 is best illustrated in Fig. 6 and comprises a tongue 78 for extension through a slot 79 extending longitudinally in the flange 77.

Fixed to the outer end of the arm by a screw 80 is a segmental button 81 having a knurled outer periphery as at 82, and a flat portion 83 adjacent the flange. Received between the flat portion 83 and the flange is a leaf spring 84 for frictionally retaining the plate against the inner surface of the flange.

Extending from the upper portion of the flange is an angularly extending tongue 85 adapted for engagement with a tongue 86 projecting angularly from the forward end of the spring 73 so that when the plate is moved slidably along the flange, the tongue 85 will contact the tongue 86 to store tension in the spring for retaining the breaker arm against the cam so that when the shoe engages the flat portions of the cam, the breaker points will be closed to energize the coils and start the motor.

To start the motor it is necessary that the rotor be in a position so that the flat portion of the cam is in contact with the breaker arm in order that the points can contact. It is also necessary that the rotor arms be out of alignment with the pole pieces, that is, not on dead center, as in this position the arms of the rotor are in the exact center of the electric fields and the rotor will not rotate in either direction.

In order to insure rotation of the rotor in a fixed direction it is necessary to move the arms out of alignment with the pole pieces and in the direction of its intended rotation, and I accomplish this through actuation of the plate 76 by providing the plate with a pawl 87 which is pivoted on a pin 88 carried by ears 89 struck laterally from the plate, and which is retained against the floor of the bottom housing plate by a spring 90 fixed to the plate 76 and bearing against the pawl.

Fixed to the floor of the bottom housing plate is a cam plate 91 having a laterally extending portion 92 spaced from the floor of the housing plate and projecting in the path of the pawl 87. The projecting portion 92 is provided with an inclined portion 93 so that when the plate is moved slidably along the flange, the pawl will engage the inclined portion 93 and travel along the top of the extending portion 92 of the plate 91. The pawl is thus raised into alignment with pins 94 depending from the under side of the rotor, as best shown in Figs. 3 and 5, and continued movement of the pawl along the plate will advance the rotor so that its arms will move out of alignment with the pole pieces, and the shoe on the breaker arm will contact the flat portion of the cam and the contact points are closed.

The pins 94 are positioned on the rotor with relation to the arms so that when the rotor is on dead center position one of the pins is in position to be engaged by the pawl to insure rotation of the rotor.

The end of the plate opposite to the inclined portion 93 is preferably cut away at a bevel as at 95 to permit the pawl to drop off of the extension 92 onto the floor of the lower housing plate out of alignment with the pins 94 so that the rotor can continue its rotation without interference with the pawl.

When it is desired to stop the rotor the plate 76 is slid rearwardly along the flange to its original position. On return movement of the plate the pawl travels below the extension 93 and is retained thereby against the floor of the housing plate so that it cannot rise into engagement with the pins 94, to interfere with the rotor, as the motor may coast after the current has been cut off.

When the pawl engages the inclined portion 93 the extension 92 is raised thereby against the spring tension so that the pawl can pass thereunder.

Attention is called to the fact that the pawl is so positioned with relation to the tongues 85 and 86 that the pawl is moved into engagement with the pins 94 to advance the rotor before tension is applied to the spring 73 which urges the breaker arm into circuit closing position, wherefore the circuit cannot be closed before the rotor is in the proper position.

In order to increase the power of the motor and to diminish arcing between the contact points, I provide the motor circuit with a condenser 96 which is mounted on the top housing blade by a strap 97 extending over the condenser and anchored to the side of the channel portion by screws 98 as clearly shown in Fig. 1.

The preferred wiring of the motor is as follows:

99 and 100 designate the line wires for supplying a source of current to the motor. The line 100 is connected to one end of the coil, the other end of the coil being connected by a conductor 101 to the plate 53 carrying the contact point 44, and the wire 99 leading to the other coil is connected by a wire 102 with the breaker point 43 so that the coils are connected in series through the breaker points.

The condenser is connected to the stationary breaker point through a wire 103 and to the movable breaker point 44 through a wire 104 which connects with wire 101.

The operation of the motor constructed and assembled as described is as follows:

To start the motor the plate 76 is moved by the button 81 to cause the pawl 87 to ride over the cam portion 93 of the extension 92, whereupon the pawl engages a pin 94 on the rotor and starts the rotor in the direction in which it is to be rotated.

Continued movement of the plate causes the tongue 85 to engage the tongue 86 for tensioning the spring and closing the contacts 43 and 44 to energize the coils.

The rotor is then actuated by influence of the pole pieces and when the arms come into approximate alignment therewith, the current to the coils is broken due to a high lobe of the cam engaging the breaker arm to separate the contacts 43 and 44, which allows the rotor arms to coast past dead center. As soon as the arms have passed dead center the cam is moved so that the breaker arm is permitted to close the contacts, reestablishing flow of current through the coils and continuing operation of the rotor.

Attention is called to the fact that the point at which the current is broken may be adjusted by shifting the rotor on the rotor shaft, and it has been found by actual experiments that the point of cut off at which the motor operates the smoothest is slightly in advance of the position where the arms of the rotor align with the pole pieces.

To stop operation of the motor the button 81 is shifted to move the plate rearwardly thereby relieving tension on the spring 73 to separate the contact points and interrupt flow of current to the coils. Continued movement of the plate re-establishes the pawl in position so that when the plate is again moved to circuit closing position, the pawl is positioned to ride over the cam 93 for engaging one of the rotor pins as previously described.

While I have described a motor including two sets of magnets, it is apparent that the motor will operate successfully with a single magnet and I do not wish to be limited to the specific arrangement of the dual magnets. However, I find it more desirable to provide the dual magnets as the power of the motor is thereby greatly increased.

In Fig. 8 I show means for electrically starting the initial movement of the rotor comprising a pair of electro-magnets 105 and 106 positioned beneath the rotor between the pole pieces of the electromagnets 1 and 2 so that the magnets can be momentarily energized to attract the arms of the rotor and position it to be acted upon by the motor magnets. The starting magnets are energized by a switch arm 107 connected with the lead line 100 and movable over a contact 108 which is connected to the coils and to the lead line 99 by a wire 109. After the arm has contacted the contact point 108 it is moved into contact with a contact point 110 to energize the motor coils for continuing rotation of the rotor.

What I claim and desire to secure by Letters Patent is:

1. A motor including an electro-magnet, a rotor movable through the field of the magnet, a cam carried by the rotor, a pivoted arm engageable with the cam, a breaker point on the arm, a fixed breaker point, a spring leaf normally retaining the arm from closing the breaker points, a shiftable plate having a projecting tongue for engaging the spring to close the breaker points, a pawl pivotally carried on the plate for initially moving the rotor, a cam plate associated with the pawl for moving the pawl into engagement with the rotor when the plate is shifted in one direction and for retaining the pawl away from the rotor when the plate is shifted in the opposite direction, and means for sliding the plate.

2. A motor including an electro-magnet, a rotor movable through the field of the magnet, a cam carried by the rotor, a pivoted arm contacting with said cam, a breaker point on the arm, a fixed breaker point, a spring leaf normally retaining the arm from closing the breaker points, a movable plate having a projecting tongue for engaging the spring to close the breaker points, a pawl on the plate, means for moving the pawl to cause initial rotation of the rotor when the plate is moved in one direction, and cam means for effecting movement of the pawl out of rotor engaging position when the plate is moved in an opposite direction.

3. In a motor including a pair of U-shaped electro-magnets having parallel aligning pole pieces provided with arcuate faces, upper and lower channel-shaped housing members enclosing the upper and lower sides of said magnets and having laterally extending flanges engaging against the pole pieces, means for securing said flanges to the pole pieces to secure the housing members to the magnets, and a rotor rotatably supported between the housing members and having arms spaced similarly to said pole piece faces.

4. In a motor including housing plates, electro-magnets supported between said plates, a rotor supported between the plates and operable by the magnets, a pawl member shiftable relatively to one of the housing plates, a cam member on said housing plate to raise the pawl member into engagement with the rotor, and means for shifting the pawl member over said cam member to start rotation of the rotor.

5. In a motor including spaced housing plates, electro-magnets supported between said plates, a rotor supported by the plates and operable by the magnets, a pawl member shiftable relatively to one of the housing plates for initially operating the rotor, and means supported by said housing plate for guiding the pawl member into position to effect initial operation of the rotor when the pawl is shifted in one direction and for retaining the pawl away from the rotor when the pawl is shifted in the reverse direction.

6. In a motor including spaced housing plates, electro-magnets supported between said plates, a rotor supported by the plates and operable by the magnets, pins depending from the rotor, a pawl member shiftable relatively to one of the housing plates for initially operating the rotor, and means supported by said housing plate for guiding the pawl member into position to engage one of said pins to effect initial operation of the rotor when the pawl is shifted in one direction and for retaining the pawl away from the pins when the pawl is shifted in the reverse direction.

7. In a motor including spaced housing plates, electro-magnets supported between said plates, a rotor supported by the plates and operable by the magnets, a pawl member shiftable relatively to one of the housing plates for initially operating the rotor, a flexible plate provided with a cam portion having one end thereof contacting the housing plate to guide the pawl member onto said cam portion to raise the pawl into functional position to effect initial rotation of the rotor when the pawl is shifted in one direction over the cam portion and having its other end spaced from said housing plate to permit the pawl to pass under said flexible plate when the pawl is shifted in the opposite direction.

In testimony whereof I affix my signature.

ARTHUR M. LUTES.